United States Patent
Su et al.

(10) Patent No.: US 11,897,779 B2
(45) Date of Patent: Feb. 13, 2024

(54) MICROPOROUS ALUMINOTITANOSILICATE CRYSTALLINE ZEOLITE, METHOD OF PREPARATION AND APPLICATIONS THEREOF

(71) Applicants: RHODIA OPERATIONS, Aubervilliers (FR); EAST CHINA NORMAL UNIVERSITY, Shanghai (CN)

(72) Inventors: Fangzheng Su, Shanghai (CN); Stéphane Streiff, Shanghai (CN); Laurent Garel, Lyons (FR); Peng Wu, Shanghai (CN); Jianyong Yin, Shanghai (CN); Xinqing Lu, Shanghai (CN)

(73) Assignees: East China Normal University, Shanghai (CN); RHODIA OPERATIONS, Aubervilliers (FR)

( * ) Notice: Subject to any disclaimer, the term of this patent is extended or adjusted under 35 U.S.C. 154(b) by 522 days.

(21) Appl. No.: 17/269,795

(22) PCT Filed: Aug. 6, 2019

(86) PCT No.: PCT/CN2019/099354
§ 371 (c)(1),
(2) Date: Feb. 19, 2021

(87) PCT Pub. No.: WO2020/038222
PCT Pub. Date: Feb. 27, 2020

(65) Prior Publication Data
US 2021/0331931 A1    Oct. 28, 2021

(30) Foreign Application Priority Data

Aug. 24, 2018    (WO) ................ PCT/CN2018/102299

(51) Int. Cl.
| | | |
|---|---|---|
| *C01B 39/02* | (2006.01) | |
| *C01B 39/06* | (2006.01) | |
| *B01J 29/70* | (2006.01) | |

(52) U.S. Cl.
CPC ............ *C01B 39/023* (2013.01); *B01J 29/70* (2013.01); *C01B 39/065* (2013.01); *C01P 2006/14* (2013.01); *C01P 2006/16* (2013.01)

(58) Field of Classification Search
CPC ...... C01B 39/023; C01B 39/065; B01J 29/70; B01J 29/00; B01J 2229/20; B01J 35/00; B01J 29/89; C01P 2006/14; C01P 2006/16; C07F 9/76; B01D 2255/50
See application file for complete search history.

(56) References Cited

U.S. PATENT DOCUMENTS

| | | | |
|---|---|---|---|
| 4,010,238 A | 3/1977 | Shiraishi et al. | |
| 4,085,193 A | 4/1978 | Nakajima et al. | |
| 4,657,644 A | 4/1987 | Bachot et al. | |
| 4,869,805 A * | 9/1989 | Lok ......... | C07C 5/222 585/666 |
| 4,938,939 A * | 7/1990 | Kuznicki ............ | C01B 39/085 423/326 |
| 4,961,917 A | 10/1990 | Byrne | |
| 5,300,472 A | 4/1994 | Brand et al. | |
| 5,389,358 A * | 2/1995 | Wu ......... | C01B 39/48 502/65 |
| 5,516,497 A | 5/1996 | Speronello et al. | |
| 5,529,969 A | 6/1996 | Bonneau et al. | |
| 7,329,627 B2 | 2/2008 | Wanninger et al. | |
| 7,922,997 B2 | 4/2011 | Moscoso et al. | |
| 8,022,262 B1 | 9/2011 | Moscoso et al. | |
| 8,367,578 B2 | 2/2013 | Collier et al. | |
| 8,479,493 B2 | 7/2013 | Kim et al. | |
| 9,216,381 B2 | 12/2015 | Rohart et al. | |
| 9,517,448 B2 | 12/2016 | Kearl et al. | |
| 2006/0142601 A1 * | 6/2006 | Zones ................ | C10G 47/16 549/533 |
| 2009/0192337 A1 * | 7/2009 | Jain ......... | C07C 41/26 568/815 |
| 2009/0257935 A1 | 10/2009 | Southward et al. | |
| 2010/0036184 A1 * | 2/2010 | Elia ............. | C07C 2/66 502/67 |
| 2010/0197479 A1 | 8/2010 | Southward et al. | |
| 2013/0000510 A1 * | 1/2013 | Ribeiro ............ | C09D 11/037 106/446 |
| 2013/0089481 A1 | 4/2013 | Sumiya et al. | |

FOREIGN PATENT DOCUMENTS

| | | |
|---|---|---|
| CN | 101239313 A | 8/2008 |
| EP | 0444470 A1 | 9/1991 |

(Continued)

OTHER PUBLICATIONS

Kubota_2008. et. al., Synthesis and catalytic performance of Ti-MCM-68 for effective oxidation reactions, Chemical Communications (Cambridge, United Kingdom) (2008), (46), 6224-6226.

(Continued)

*Primary Examiner* — Timothy C Vanoy
(74) *Attorney, Agent, or Firm* — Osha Bergman Watanabe & Burton LLP

(57) ABSTRACT

It relates to a microporous aluminotitanosilicate crystalline zeolite, method of preparation and applications thereof. It extends to a catalytic hydroxylation, by reaction of a compound of formula (I) with $H_2O_2$ in the presence of a catalyst comprising the zeolite.

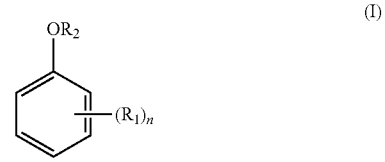

(I)

20 Claims, 4 Drawing Sheets

(56) References Cited

FOREIGN PATENT DOCUMENTS

| | | | | |
|---|---|---|---|---|
| EP | 0460730 A1 | 12/1991 | | |
| EP | 0 634 212 A1 * | 1/1995 | ............. | B01J 29/89 |
| EP | 1 110 910 A1 * | 6/2001 | ............. | C01B 37/00 |
| EP | 1435338 A1 | 7/2004 | | |
| EP | 2505262 A1 | 10/2012 | | |
| FR | 2570087 A1 | 3/1986 | | |
| WO | WO 2005 030 646 A1 * | 4/2005 | ........... | A61K 31/517 |
| WO | 2007131902 A2 | 11/2007 | | |
| WO | WO 2009 154 783 A2 * | 12/2009 | ............. | C01B 39/48 |
| WO | 2011080525 A1 | 7/2011 | | |
| WO | 2013163536 A1 | 10/2013 | | |
| WO | 2016033046 A1 | 3/2016 | | |

OTHER PUBLICATIONS

Sasaki. et. al., Ti-YNU-2: A Microporous Titanosilicate with Enhanced Catalytic Performance for Phenol Oxidation, ACS Catalysis (2014), 4(8), 2653-2657.

Kubota_2015. et. al., High-Performance Catalysts with MSE-Type Zeolite Framework, Topics in Catalysis (2015), 58(7-9), 480-493.

"Boting_2015. et. al., Synthesis of Novel Titanosilicate Catalysts by SimultaneousIsomorphous Substitution and Interlayer Expansion of Zeolitic Layered Silicates, Chem. Mater. 2016, 28, 5295-5303".

Inagaki. et. al., Enhancement of para-selectivity in the phenol oxidation with H2O2 over 'Ti-MCM-68 zeolite catalyst, Green Chemistry (2016), 18(3), 735-741.

Ikehara. et. al., Preparation of MSE-type Titanosilicate via Crystallization of titanoaluminosilicate and Its Catalytic Use for Selective Oxidation of Phenol Using H2O2, Chem. Lett. 2017, 46, 1842-1845.

Lee. et. al., Synthesis of zeolite UZM-35 and catalytic properties of copper-exchanged UZM-35 for ammonia selective catalytic reduction, Applied Catalysis, B: Environmental (2017), 200, 428-438.

"WU_2008. et. al., Simultaneous removal of soot and NO over thermal stable Cu—Ce—Al mixed oxides, Catalysis Communications, vol. 9, Issue 14, Aug. 30, 2008, pp. 2428-2432".

"WU_2011. et. al., MnOx—CeO2—Al2O3 mixed oxides for soot oxidation: Activity and thermal stability, Journal of Hazardous Materials 187 (2011) 283-290".

Ilieva. et. al., Gold catalysts supported on CeO2 and CeO2—Al2O3 for NOx reduction by CO, Applied Catalysis B: Environmental 65 (2006) 101-109.

Heynderickx. et. al., The total oxidation of propane over supported Cu and Ce oxides: A comparison of single and binary metal oxides, Journal of Catalysis, vol. 272, Issue 1, May 25, 2010, pp. 109-120.

Prinetto. et. al., FT-IR and TPD Investigation of the NOx Storage Properties of BaO/Al2O3 and Pt-BaO/Al2O3 Catalysts, J. Phys. Chem. B 2001, 105, 51, 12732-12745.

Lesage. et. al., Studying the NOx-trap mechanism over a Pt-Rh/Ba/Al2O3catalyst by operando FT-IR spectroscopy, Phys. Chem. Chem. Phys. 2003, 4435-4440.

Nova. et. al., NOx adsorption study over Pt-Ba/alumina catalysts: FT-IR and pulse experiments, Journal of Catalysis, vol. 222, Issue 2, Mar. 10, 2004, pp. 377-388.

Mosqueda-Jiménez. et. al., Operando systems for the evaluation of the catalytic performance of NOx storage and reduction materials, Catalysis Today, vol. 119, Issues 1-4, Jan. 15, 2007, pp. 73-77.

Lietti. et. al., Relevance of the Nitrite Route in the NOx Adsorption Mechanism over Pt—Ba/Al2O3 NOx Storage Reduction Catalysts Investigated by using Operando FTIR Spectroscopy, vol. 4, Issue1, Jan. 2, 2012, pp. 55-58.

Crocker. et. al., Al2O3-based Passive NOx Adsorbers for Low Temperature Applications, e 8' International Conference on Environmental Catalysis held on Aug. 24-27, 2014 in North Carolina (USA).

Marcotte. et. al., Multi-component zirconia-titania mixed oxides: Catalytic materials with unprecedented performance in the selective catalytic reduction of NOx with NH3 after harsh hydrothermal ageing, Applied Catalysis B: Environmental, vol. 105, Issues 3-4, Jun. 22, 2011, pp. 373-376.

Brunauer. et. al., Adsorption of Gases in Multimolecular Layers, J. Am. Chem. Soc. 1938, 60, 2, 309-319.

* cited by examiner

MICROPOROUS ALUMINOTITANOSILICATE CRYSTALLINE ZEOLITE, METHOD OF PREPARATION AND APPLICATIONS THEREOF

CROSS-REFERENCE TO RELATED APPLICATION

This application is a U.S. national phase entry under 35 U.S.C. § 371 of International Application No. PCT/CN2019/099354, filed on Aug. 6, 2019, which claims priority to International Application No. PCT/CN2018/102299 filed on Aug. 24, 2018, the whole content of these applications being incorporated herein by reference for all purposes.

TECHNICAL FIELD

The present invention relates to a microporous aluminotitanosilicate crystalline zeolite, method of preparation and applications thereof.

BACKGROUND

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

Zeolites are crystalline aluminosilicate compositions which are microporous and which are formed from corner sharing $AlO_2$ and $SiO_2$ tetrahedra. Numerous zeolites, both naturally occurring and synthetically prepared are used in various industrial processes. Synthetic zeolites are prepared via hydrothermal synthesis employing suitable sources of Si, Al and structure directing agents such as alkali metals, alkaline earth metals, amines, or organoammonium cations. The structure directing agents reside in the pores of the zeolite and are largely responsible for the particular structure that is ultimately formed. These species balance the framework charge associated with aluminum and can also serve as space fillers. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on outside surfaces as well as on internal surfaces within the pore.

One particular zeolite, designated MCM-68 was disclosed by Calabro et al. in 1999 (U.S. Pat. No. 6,049,018). This patent describes the synthesis of MCM-68 from dication directing agents, N,N,N,N-tetraalkylbicyclo[2.2.2.]oct-7-ene-2,3:5,6-dipyrrolidinium dication, and N,N,N,N-tetraalkylbicyclo[2.2.2.]octane-2,3:5,6-dipyrrolidinium dication. The MCM-68 was found to have at least one channel system in which each channel is defined by a 12-membered ring of tetrahedrally coordinated atoms and at least two further independent channel systems in which each channel is defined by a 10-membered ring of tetrahedrally coordinated atoms wherein the number of unique 10-membered ring channels is twice the number of 12-membered ring channels.

Another particular zeolite, designated UZM-35, has similar topology to that is observed for MCM-68 as reported by U.S. Pat. No. 7,922,997.

Ti-MCM-68, with MSE topology has been developed as selective phenol oxidation catalysts as reported by Chem. Lett. 2017, 46, 1842-1845 and ACS Catal. 2014, 4, 2653-2657. However, the conversion of phenol and selectivity towards hydroquinone is still not ideal enough for industrialization.

SUMMARY OF THE INVENTION

In view of the shortcoming of the processes set forth above, it is therefore an objective of the present invention to provide a titanium-substituted zeolite, notably microporous aluminotitanosilicate crystalline zeolite, which has high catalytic activities towards $H_2O_2$ conversion and high selectivity towards hydroquinone in the hydroxylation reaction of phenol with $H_2O_2$. More generally the crystalline zeolite of the present invention has high catalytic activities towards $H_2O_2$ conversion and high selectivity towards the para-hydroxylation of compounds of formula (I).

In one aspect, the present invention concerns a microporous aluminotitanosilicate crystalline zeolite having a three-dimensional framework of $AlO_2$, $SiO_2$ and $TiO_2$ tetrahedral units and an empirical composition in the as synthesized and anhydrous basis expressed by an empirical formula of:

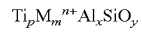

$$Ti_p M_m^{n+} Al_x SiO_y$$

wherein:
p is the mole ratio of Ti to Si and has a value from 0.005 to about 0.1,
M represents a potassium ion and/or sodium ion, or their exchangeable cations,
m is the mole ratio of M to Si and varies from about 0.001 to about 0.05,
n is the valence of M,
x is the mole ratio of Al to Si and varies from 0.0025 to about 0.1; and
y has a value determined by the equation:

$$y=(4 \cdot p+m \cdot n+3 \times x+4)/2$$

and is characterized in that it has the x-ray diffraction pattern having at least the intensities set forth in Table A:

TABLE A

| 2θ(Degree) | I/Io % |
|---|---|
| 6.45-6.8 | m |
| 6.75-7.13 | m-vs |
| 7.86-8.26 | m |
| 8.64-9.04 | m |
| 9.51-10.09 | m-vs |
| 10.62-11.23 | w-m |
| 13.4-14.22 | w-m |
| 14.76-15.55 | w |
| 17.63-18.37 | m |
| 19.17-19.91 | w-m |
| 19.64-20.56 | m |
| 20.18-21.05 | w-m |
| 20.7-21.57 | w-m |
| 21.36-22.28 | vs |
| 22.17-23.6 | m-s |
| 22.7-23.8 | w-m |
| 24.12-25.23 | w |
| 25.6-26.94 | m |
| 26.37-27.79 | m |
| 27.02-28.42 | m |
| 27.53-28.89 | m |

TABLE A-continued

| 2θ(Degree) | I/Io % |
|---|---|
| 28.7-30.09 | m |
| 29.18-30.72 | w-m |
| 30.19-31.73 | m |
| 30.83-32.2 | w |
| 32.81-34.22 | w |
| 35.63-36.99 | w |
| 41.03-42.86 | w |
| 44.18-45.83 | w |
| 44.87-46.57 | w |
| 46.07-47.35 | w |
| 48.97-50.42 | w | wherein: the ratio of MSE framework characteristic peak intensity at a 2θ angle equal to 21.7 degree, to MFI framework characteristic peak intensity at a 2θ angle equal to 23.3 degree ranges from 80:1 to 1:1 in x-ray diffraction pattern.

In another aspect, the present invention also relates to a method for synthesizing a microporous aluminotitanosilicate crystalline zeolite described above, which comprises at least the following steps:
(i) preparing a mixture comprising at least water and
   an aluminum source,
   an alkali source,
   a structure directing agent,
   a silicon source,
   a crystalline aluminosilicate zeolite having a three-dimensional framework of AlO₂ and SiO₂ tetrahedral units and having an MSE framework type,
(ii) heating the reaction mixture at a temperature from 100° C. to 200° C., for a time sufficient to form a zeolite,
(iii) dealuminating of the zeolite with an acid,
(iv) optionally calcining the dealuminated zeolite at a temperature from 500 to 1000° C.,
(v) contacting the zeolite with a titanium source,
(vi) calcining the zeolite at a temperature from 500 to 1000° C.

The present invention also concerns a catalyst composition comprising abovementioned zeolite.

The present invention extends to a catalytic hydroxylation of a compound of formula (I) with $H_2O_2$ in the presence of a catalyst comprising abovementioned zeolite,

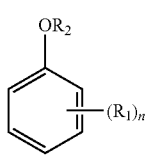

(I)

wherein:
n is a number from 0 to 4, preferably equal to 0, 1 or 2;
$R_1$, which are identical or different, represent an alkyl group, an alkoxy group, a hydroxyl group, a halogen atom, a haloalkyl group or a perhaloalkyl group;
$R_2$ represents a hydrogen atom, an alkyl group, a cycloalkyl group, an aryl group or an aralkyl group.

DEFINITIONS

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

As used herein, the term "alkyl" means a saturated hydrocarbon radical, which may be straight, branched or cyclic, such as, methyl, ethyl, n-propyl, iso-propyl, n-butyl, sec-butyl, t-butyl, pentyl, n-hexyl, cyclohexyl.

As used herein, the term "aryl" refers to a monovalent aromatic hydrocarbon group, including bridged ring and/or fused ring systems, containing at least one aromatic ring. Examples of aryl groups include phenyl, naphthyl and the like. The term "arylalkyl" or the term "aralkyl" refers to alkyl substituted with an aryl. The term "arylalkoxy" refers to an alkoxy substituted with aryl.

As used herein, the term "cyclic group" means a closed ring hydrocarbon group that is classified as an alicyclic group, aromatic group, or heterocyclic group.

The term "alicyclic group" means a cyclic hydrocarbon group having properties resembling those of aliphatic groups.

As used herein, the term "cycloalkyl" as used herein means cycloalkyl groups containing from 3 to 8 carbon atoms, such as for example cyclohexyl.

The articles "a", "an" and "the" are used to refer to one or to more than one (i.e., to at least one) of the grammatical object of the article.

The term "and/or" includes the meanings "and", "or" and also all the other possible combinations of the elements connected to this term.

As used herein, "weight percent," " %," "percent by weight," "% by weight," and variations thereof refer to the concentration of a substance as the weight of that substance divided by the total weight of the composition and multiplied by 100.

It should be noted that in specifying any range of concentration, weight ratio or amount, any particular upper concentration, weight ratio or amount can be associated with any particular lower concentration, weight ratio or amount, respectively.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

The term "between" should be understood as being inclusive of the limits.

DETAILED DESCRIPTION OF THE INVENTION

Figure 1:
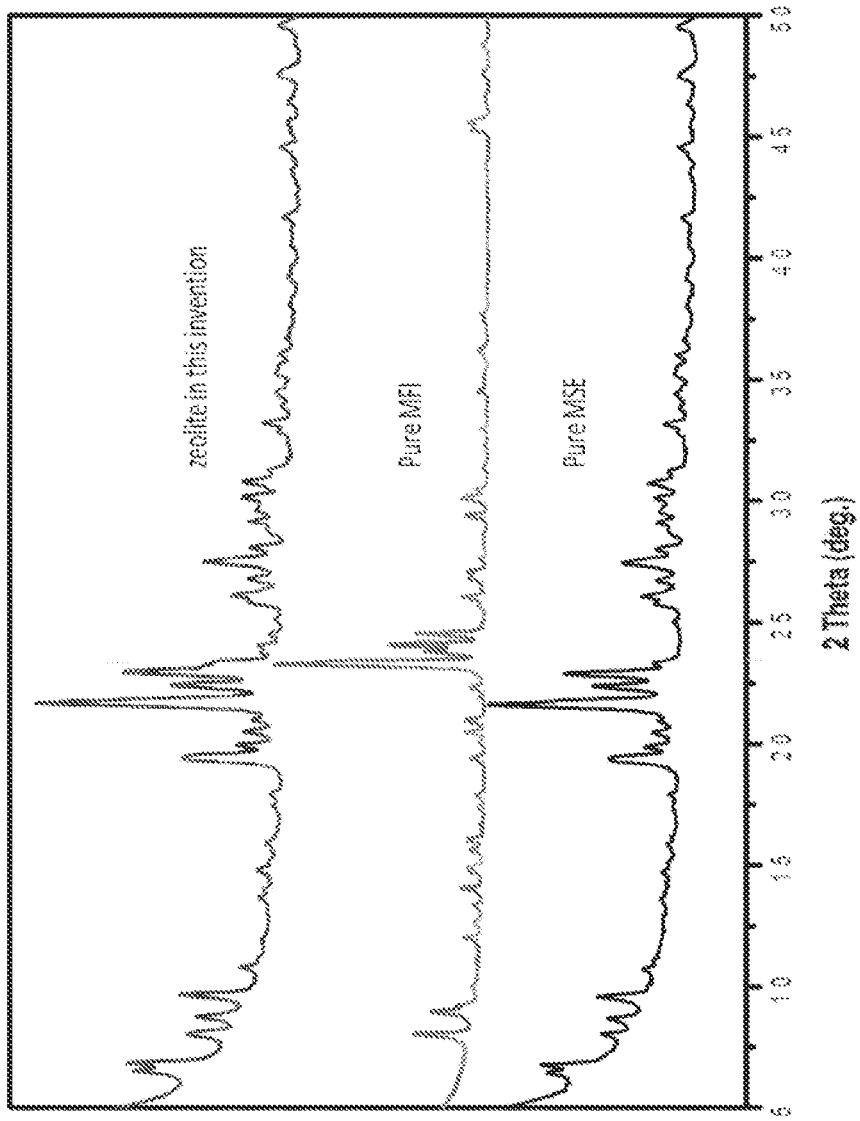
FIG. 1 is a XRD image of microporous aluminotitanosilicate crystalline zeolite according to the present invention, ZSM-5 (pure MFI) and MCM-68 (pure MSE).

The titanium-containing microporous crystalline zeolite according to the present invention has a topological structure related to a MSE framework and a MFI framework. MSE framework or MFI framework is one of the framework type codes assigned by International Zeolite Association (IZA) structure commission, which is authorized by IUPAC.

Typically, MSE framework is notably described in "Crystal Structure of Zeolite MCM-68: A New Three-Dimensional Framework with Large Pores", Douglas et al., J. Phys. Chem. B, 2006,110 (5), pp 2045-2050.

MFI framework is notably described in Kokotailo, G. T., Lawton, S. L., Olson, D. H. and Meier, W. M. "Structure of synthetic zeolite ZSM-5" Nature, 272, 437-438 (1978). Olson, D. H., Kokotailo, G. T., Lawton, S. L. and Meier, W. M. "Crystal Structure and Structure-Related Properties of ZSM-5" J. Phys. Chem., 85, 2238-2243 (1981) and van Koningsveld, H., van Bekkum, H. and Jansen, J. C. "On the location and disorder of the tetrapropylammonium (TPA) ion in zeolite ZSM-5 with improved framework accuracy" Acta Crystallogr., B43, 127- 132 (1987).

The instant microporous aluminotitanosilicate crystalline zeolite having a three-dimensional framework of $AlO_2$, $SiO_2$ and $TiO_2$ tetrahedral units and an empirical composition in the as synthesized and anhydrous basis expressed by an empirical formula of:

$$Ti_p M_m^{n+} Al_x SiO_y$$

Wherein:
p is the mole ratio of Ti to Si and has a value from 0.005 to about 0.1,
M represents a potassium ion and/or sodium ion, or their exchangeable cations,
m is the mole ratio of M to Si and varies from about 0.001 to about 0.05,
n is the valence of M,
x is the mole ratio of Al to Si and varies from 0.0025 to about 0.1; and
y has a value determined by the equation:

$$y=(4 \cdot p + m \cdot n + 3 \cdot x + 4)/2$$

and is characterized in that it has the x-ray diffraction pattern having at least the intensities set forth in Table A:

TABLE A

| 2θ(Degree) | I/Io % |
|---|---|
| 6.45-6.8 | m |
| 6.75-7.13 | m-vs |
| 7.86-8.26 | m |
| 8.64-9.04 | m |
| 9.51-10.09 | m-vs |
| 10.62-11.23 | w-m |

TABLE A-continued

| 2θ(Degree) | I/Io % |
|---|---|
| 13.4-14.22 | w-m |
| 14.76-15.55 | w |
| 17.63-18.37 | m |
| 19.17-19.91 | w-m |
| 19.64-20.56 | m |
| 20.18-21.05 | w-m |
| 20.7-21.57 | w-m |
| 21.36-22.28 | vs |
| 22.17-23.6 | m-s |
| 22.7-23.8 | w-m |
| 24.12-25.23 | w |
| 25.6-26.94 | m |
| 26.37-27.79 | m |
| 27.02-28.42 | m |
| 27.53-28.89 | m |
| 28.7-30.09 | m |
| 29.18-30.72 | w-m |
| 30.19-31.73 | m |
| 30.83-32.2 | w |
| 32.81-34.22 | w |
| 35.63-36.99 | w |
| 41.03-42.86 | w |
| 44.18-45.83 | w |
| 44.87-46.57 | w |
| 46.07-47.35 | w |
| 48.97-50.42 | w | wherein: the ratio of MSE framework characteristic peak intensity at a 2θ angle equal to 21.7 degree, to MFI framework characteristic peak intensity at a 2θ angle equal to 23.3 degree ranges from 80:1 to 1:1 in x-ray diffraction pattern.

When M is an exchangeable cation of potassium ion or sodium ion, it can be selected from the group consisting of alkali, alkaline earth metals, rare earth metals, ammonium ion, hydrogen ion and mixtures thereof.

Where M is only one metal, then the weighted average valence is the valence of that one metal, i.e. +1 or +2. However, when more than one M metal is present, the total amount of:

$$M_m^{n+} = M_{m1}^{(n1)+} + M_{m2}^{(n2)+} + M_{m3}^{(n3)}$$

and the weighted average valence "n" is given by the equation:

$$n = \frac{m_1 \cdot n_1 + m_2 \cdot n_2 + m_3 \cdot n_3 + \ldots}{m_1 + m_2 + m_3 + \ldots}$$

Preferably, p is from 0.008 to 0.1.
Preferably, m is from 0.001 to 0.01.
Preferably, x is from 0.0025 to 0.02.
Preferably, y is from 2 to 3.

The structure of the zeolite according to this invention was determined by x-ray analysis. The x-ray patterns presented in the following examples were obtained using standard x-ray powder diffraction techniques. The radiation source was a high-intensity, x-ray tube operated at 45 kV and 35 ma. The diffraction pattern from the copper K-alpha radiation was obtained by appropriate computer based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "Io" being the intensity of the strongest line or peak, and "I" being the intensity of each of the other peaks. In terms of 100×I/Io, the above designations are defined as:

w=0-15; m=15-60; s=60-80 and vs=80-100 vs, s, m, and w which represent very strong, strong, medium, and weak, respectively.

Figure 3:
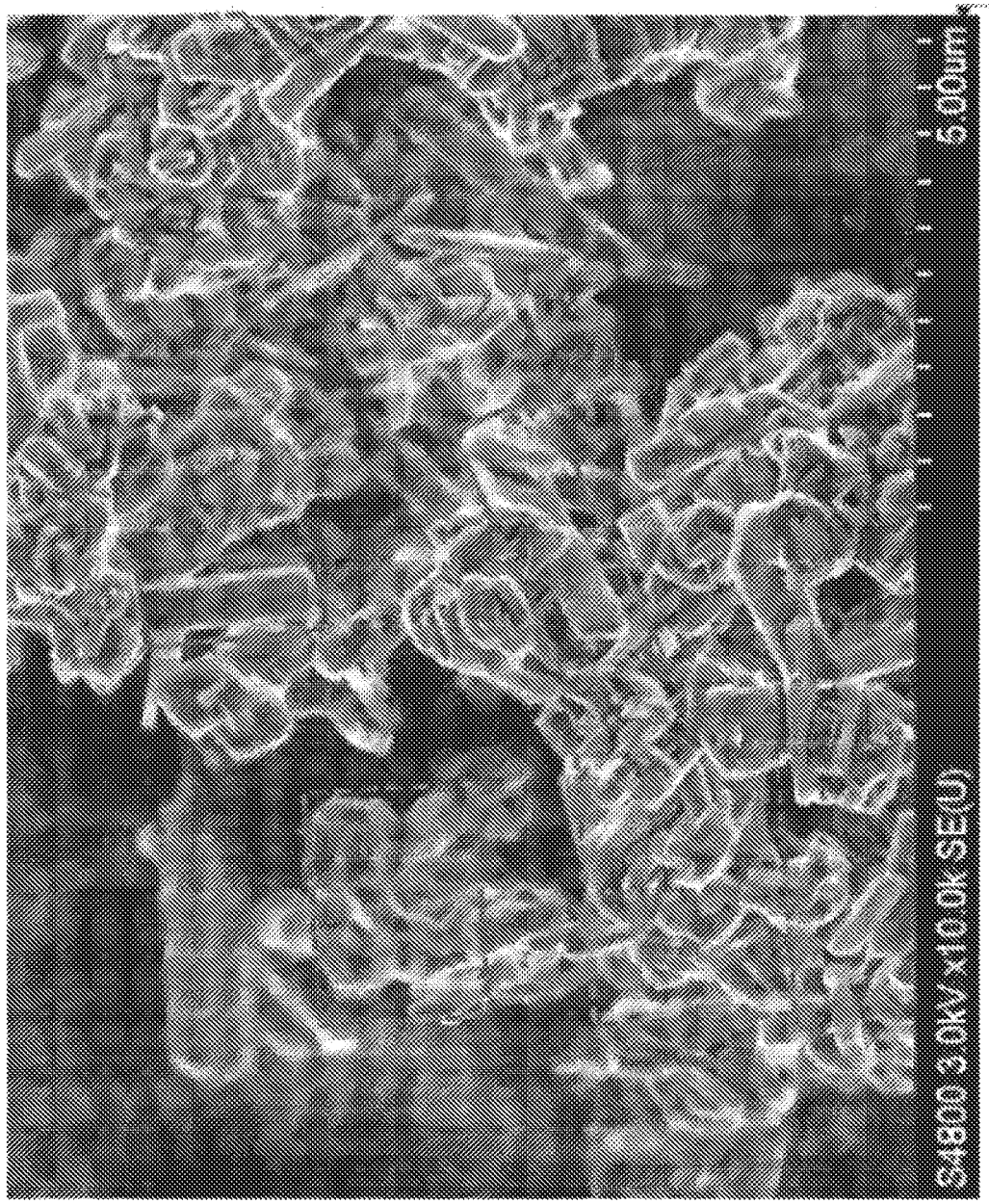
FIG. 3 is a SEM image of microporous aluminotitanosilicate crystalline zeolite according to the present invention, illustrating its typical morphology. It shows the zeolite has both MSE-type framework (dotted rectangle) and MFI-type framework (solid rectangle).

The microporous aluminotitanosilicate crystalline zeolite according to the present invention has both MSE-type framework and MFI-type framework as shown by FIG. 3.

In one preferred embodiment, the weight ratio of the crystalline zeolite existing in the form of MSE-type framework is in the range of 50% to 99% based on total weight of the zeolite and the weight ratio of the crystalline zeolite existing in the form of MFI-type framework is in the range of 1% to 50% based on total weight of the zeolite.

The crystalline zeolite existing in the form of MFI-type framework is embedded in the zeolite existing in the form of MSE-type framework as shown by FIG. 3.

Figure 4:
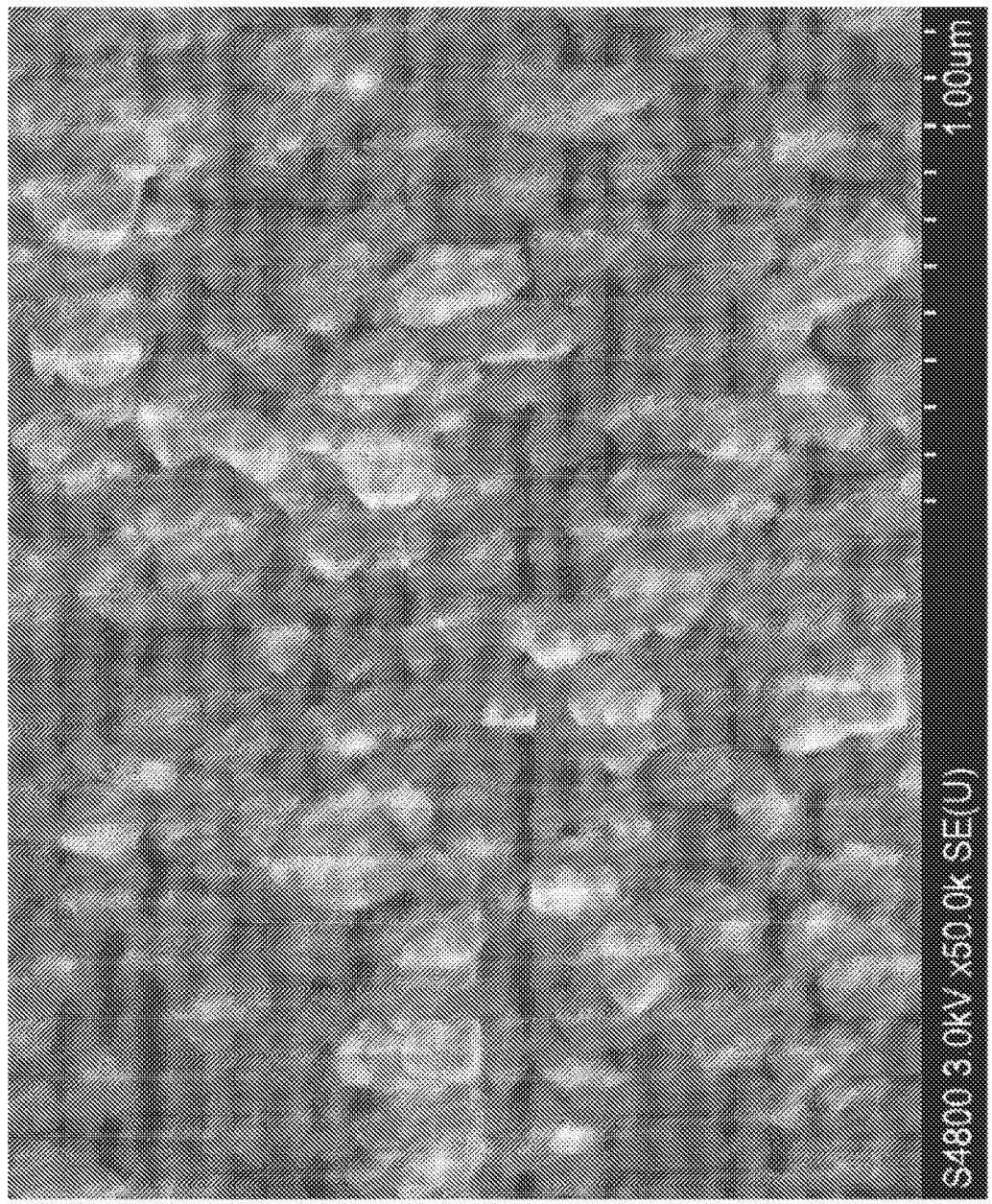
FIG. 4 is a SEM image of MCM-68 (pure MSE).

The morphology of the zeolite according to the present invention is different from MCM-68, which has pure MSE-type framework as shown by FIG. 4.

The crystal size of the zeolite according to the present invention is in the range of 0.15 μm to 1.00 μm as observed by SEM and preferably 0.40 μm to 0.50 μm.

The present invention concerns then a method for synthesizing a microporous aluminotitanosilicate crystalline zeolite having a three-dimensional framework of $AlO_2$, $SiO_2$ and $TiO_2$ tetrahedral units and an empirical composition in the as synthesized and anhydrous basis expressed by an empirical formula of:

$$Ti_p M_m^{n+} Al_x SiO_y$$

wherein:
p is the mole ratio of Ti to Si and has a value from 0.005 to about 0.1,
M represents a potassium ion and/or sodium ion, or their exchangeable cations,
m is the mole ratio of M to Si and varies from about 0.001 to about 0.05,
n is the valence of M,
x is the mole ratio of Al to Si and varies from 0.0025 to about 0.1; and
y has a value determined by the equation:

$$y=(4 \cdot p + m \cdot n + 3 \cdot x + 4)/2$$

and is characterized in that it has the x-ray diffraction pattern having at least the intensities set forth in Table A:

TABLE A

| 2θ(Degree) | I/Io % |
|---|---|
| 6.45-6.8 | m |
| 6.75-7.13 | m-vs |
| 7.86-8.26 | m |
| 8.64-9.04 | m |
| 9.51-10.09 | m-vs |
| 10.62-11.23 | w-m |
| 13.4-14.22 | w-m |
| 14.76-15.55 | w |
| 17.63-18.37 | m |
| 19.17-19.91 | w-m |
| 19.64-20.56 | m |
| 20.18-21.05 | w-m |
| 20.7-21.57 | w-m |
| 21.36-22.28 | vs |
| 22.17-23.6 | m-s |
| 22.7-23.8 | w-m |
| 24.12-25.23 | w |
| 25.6-26.94 | m |
| 26.37-27.79 | m |
| 27.02-28.42 | m |
| 27.53-28.89 | m |
| 28.7-30.09 | m |
| 29.18-30.72 | w-m |

TABLE A-continued

| 2θ(Degree) | I/Io % |
|---|---|
| 30.19-31.73 | m |
| 30.83-32.2 | w |
| 32.81-34.22 | w |
| 35.63-36.99 | w |
| 41.03-42.86 | w |
| 44.18-45.83 | w |
| 44.87-46.57 | w |
| 46.07-47.35 | w |
| 48.97-50.42 | w | wherein: the ratio of MSE framework characteristic peak intensity at a 2θ angle equal to 21.7 degree, to MFI framework characteristic peak intensity at a 2θ angle equal to 23.3 degree ranges from 80:1 to 1:1 in x-ray diffraction pattern, comprising at least the following steps:
(i) preparing a mixture comprising at least water and
an aluminum source,
an alkali source,
a structure directing agent,
a silicon source,
a crystalline aluminosilicate zeolite having a three-dimensional framework of $AlO_2$ and $SiO_2$ tetrahedral units and having an MSE framework type,
(ii) heating the reaction mixture at a temperature from 100° C. to 200° C., for a time sufficient to form a zeolite,
(iii) dealuminating of said zeolite with an acid,
(iv) optionally drying the dealuminated zeolite at a temperature from 50 to 200° C. and/or calcining the dealuminated zeolite at a temperature from 500 to 1000° C.,
(v) contacting the zeolite with a titanium source; and
(vi) calcining the zeolite at a temperature from 500 to 1000° C.

Step (i)

The aluminum sources include but are not limited to aluminum alkoxides, precipitated aluminas, aluminum metal, aluminum salts and alumina sols. Specific examples of the aluminum source can be aluminium hydroxide, sodium aluminate, aluminium nitrate, aluminium sulfate, aluminium oxide, aluminum ortho sec-butoxide and aluminum ortho isopropoxide.

The alkali sources include but are not limited to alkali metal hydroxide, alkali metal salts, such as halide salts, nitrate salts, acetate salts, carbonate and bicarbonates. Specific examples of the alkali source can be lithium hydroxide, sodium hydroxide, potassium hydroxide, sodium carbonate, sodium bicarbonate, potassium carbonate and potassium bicarbonate.

In some embodiments, the alkali source comprises potassium hydroxide and/or potassium salts. It is surprisingly found that the catalyst prepared in this way has higher catalytic activities towards $H_2O_2$ conversion and high selectivity towards hydroquinone in the hydroxylation reaction of phenol with $H_2O_2$.

In a preferred embodiment, the alkali sources comprises potassium hydroxide and/or potassium salts, and sodium hydroxide and/or sodium salts. The molar ratio of $K^+/Na^+$ is equal to or higher than 1. More preferably, the molar ratio of $K^+/Na^+$ is in the range of 2 to 5.

The structure directing agent is used to guide the formation of particular types of pores and channels during the synthesis of zeolites. Preferably, the structure directing agent is an organic compound having an organoammonium cation selected from the group consisting of dimethyldipropylammonium, choline, ethyltrimethylammonium(ETMA), diethyldimethylammonium(DEDMA), tetraethylammonium (TEA), tetrapropylammonium(TPA), trimethylpropylammonium, trimethylbutylammonium, dimethyldiethanolammonium and mixtures thereof. The structure directing agent can be preferably hydroxide, chloride, bromide, iodide or fluoride compounds. Specific examples of the structure directing agent can be dimethyl dipropylammonium hydroxide, dimethyldipropyl ammonium chloride, dimethyl dipropylammonium bromide, ethyltrimethyl ammonium hydroxide, diethyl dim ethyl ammonium hydroxide, tetraethylammonium hydroxide, tetrapropylammonium hydroxide or tetrapropylammonium chloride.

The silicon source include but are not limited to silica, silicon-containing compounds capable of generating silicate ions in water, colloidal silica, precipitated silica, wet process silica, dry process silica, alkali silicates, such as sodium silicate and potassium silicate.

The crystalline aluminosilicate zeolite having a three-dimensional framework of $AlO_2$ and $SiO_2$ tetrahedral units and having an MSE framework type is added into the reaction medium as a seed. Said seed with MSE framework type can be MCM-68, YNU-2 and UZM-35. MCM-68 is the preferable seed. The weight ratio of silicon source to the seed is in the range of 3:1 to 40:1.

The weight ratio of aluminum source to silicon source is in the range of 1:5 to 1:50.

The weight ratio of alkali source to silicon source is in the range of 0.05:1 to 5:1.

The weight ratio of structure directing agent to silicon source is in the range of 0.05:1 to 5:1.

Preferably, the weight ratio of structure directing agent to silicon source is in the range of 0.05:1 to 1:1.

In some embodiments, an aluminum precursor can be formed first by mixing the aluminum source and the alkali source in an aqueous solution. Then, the structure directing agent and the silicon source is added into the solution and kept stirring for a time sufficient to obtain a sol, which was followed by the addition of the crystalline aluminosilicate zeolite having a three-dimensional framework of $AlO_2$ and $SiO_2$ tetrahedral units and having an MSE framework type.

Step (ii)

The heating time sufficient to form a zeolite may preferably be from 0.5 to 21 days.

Step (iii)

The acid for dealuminating the zeolite is not particularly limited. Preferably, the acid is an inorganic acid such as hydrogen chloride, hydrogen bromide, sulphuric acid, or nitric acid. Among these, nitric acid is more preferable.

Notably when nitric acid is used, the acid concentration may be from 0.05 M to 10 M.

The dealumination step can be repeated for one or more times in order to obtain an atomic Si/Al ratio from 50 to 400.

Step (iv)

The temperature of calcination is preferably from 500 to 800° C.

Step (v)

The titanium source according to the present invention may be titanium salts such as titanium tetrachloride, titanium tetrabromide, titanium isopropoxide, titanium n-butoxide, titanium ethoxide, titanium trichloride and titanyl sulfate etc.

The titanium source may also be titanium oxysulfate, titanium oxychloride, titania slurries, or titanium hydroxide.

The titanium source can be introduced in gas or liquid phase, preferred in gas phase.

Step (vi)

The temperature of calcination is preferably from 500 to 800° C.

In another aspect, the present invention relates to a microporous aluminotitanosilicate crystalline zeolite having a three-dimensional framework of $AlO_2$, $SiO_2$ and $TiO_2$ tetrahedral units and an empirical composition in the as synthesized and anhydrous basis expressed by an empirical formula of:

$$Ti_pM_m^{n+}Al_xSiO_y$$

wherein:
p is the mole ratio of Ti to Si and has a value from 0.005 to about 0.1,
M represents a potassium ion and/or sodium ion, or their exchangeable cations,
m is the mole ratio of M to Si and varies from about 0.001 to about 0.05,
n is the valence of M,
x is the mole ratio of Al to Si and varies from 0.0025 to about 0.1; and
y has a value determined by the equation:

$$y=(4 \cdot p+m \cdot n+3 \cdot x+4)/2$$

obtainable from the process according to the present invention.

Accordingly the microporous aluminotitanosilicate crystalline zeolite obtainable according to the process of the present invention is characterized in that it has the x-ray diffraction pattern having at least the intensities set forth in Table A:

TABLE A

| 2θ(Degree) | I/Io % |
|---|---|
| 6.45-6.8 | m |
| 6.75-7.13 | m-vs |
| 7.86-8.26 | m |
| 8.64-9.04 | m |
| 9.51-10.09 | m-vs |
| 10.62-11.23 | w-m |
| 13.4-14.22 | w-m |
| 14.76-15.55 | w |
| 17.63-18.37 | m |
| 19.17-19.91 | w-m |
| 19.64-20.56 | m |
| 20.18-21.05 | w-m |
| 20.7-21.57 | w-m |
| 21.36-22.28 | vs |
| 22.17-23.6 | m-s |
| 22.7-23.8 | w-m |
| 24.12-25.23 | w |
| 25.6-26.94 | m |
| 26.37-27.79 | m |
| 27.02-28.42 | m |
| 27.53-28.89 | m |
| 28.7-30.09 | m |
| 29.18-30.72 | w-m |
| 30.19-31.73 | m |
| 30.83-32.2 | w |
| 32.81-34.22 | w |
| 35.63-36.99 | w |
| 41.03-42.86 | w |
| 44.18-45.83 | w |
| 44.87-46.57 | w |
| 46.07-47.35 | w |
| 48.97-50.42 | w | wherein: the ratio of MSE framework characteristic peak intensity at a 2θ angle equal to 21.7 degree, to MFI framework characteristic peak intensity at a 2θ angle equal to 23.3 degree ranges from 80:1 to 1:1 in x-ray diffraction pattern.

The present invention also concerns a catalyst composition comprising a microporous aluminotitanosilicate crystalline zeolite having a three-dimensional framework of $AlO_2$, $SiO_2$ and $TiO_2$ tetrahedral units and an empirical composition in the as synthesized and anhydrous basis expressed by an empirical formula of:

$$Ti_pM_m^{n+}Al_xSiO_y$$

wherein:
p is the mole ratio of Ti to Si and has a value from 0.005 to about 0.1,
M represents a potassium ion and/or sodium ion, or their exchangeable cations,
m is the mole ratio of M to Si and varies from about 0.001 to about 0.05, n is the valence of M, x is the mole ratio of Al to Si and varies from 0.0025 to about 0.1; and y has a value determined by the equation:

$$y=(4 \cdot p+m \cdot n+3 \cdot x+4)/2$$

and is characterized in that it has the x-ray diffraction pattern having at least the intensities set forth in Table A:

TABLE A

| 2θ(Degree) | I/Io % |
|---|---|
| 6.45-6.8 | m |
| 6.75-7.13 | m-vs |
| 7.86-8.26 | m |
| 8.64-9.04 | m |
| 9.51-10.09 | m-vs |
| 10.62-11.23 | w-m |
| 13.4-14.22 | w-m |
| 14.76-15.55 | w |
| 17.63-18.37 | m |
| 19.17-19.91 | w-m |
| 19.64-20.56 | m |
| 20.18-21.05 | w-m |
| 20.7-21.57 | w-m |
| 21.36-22.28 | vs |
| 22.17-23.6 | m-s |
| 22.7-23.8 | w-m |
| 24.12-25.23 | w |
| 25.6-26.94 | m |
| 26.37-27.79 | m |
| 27.02-28.42 | m |
| 27.53-28.89 | m |
| 28.7-30.09 | m |
| 29.18-30.72 | w-m |
| 30.19-31.73 | m |
| 30.83-32.2 | w |
| 32.81-34.22 | w |
| 35.63-36.99 | w |
| 41.03-42.86 | w |
| 44.18-45.83 | w |
| 44.87-46.57 | w |
| 46.07-47.35 | w |
| 48.97-50.42 | w | wherein: the ratio of MSE framework characteristic peak intensity at a 2θ angle equal to 21.7 degree, to MFI framework characteristic peak intensity at a 2θ angle equal to 23.3 degree ranges from 80:1 to 1:1 in x-ray diffraction pattern.

The catalyst composition comprising at least 0.2 wt. % zeolite according to the present invention based on total weight of the catalyst. Preferably, the catalyst composition comprising 50 wt. % to 100 wt. % zeolite according to the present invention based on total weight of the catalyst.

In said catalyst composition, the zeolite according to the present invention may be used in the form of powders, including powders consisting wholly or in part of single crystals, or instead be incorporated in shaped agglomerates, such as tablets, extrudates or spheres, which may be obtained by combining the zeolite with a binder material that is substantially inert under the conditions of the applied catalytic reaction. As binder material, any suitable material may be used, for example, silica, metal oxides, or clays, such as montmorillonite, bentonite and kaolin clays, the clays optionally being calcined or chemically modified prior to use.

The present invention extends to a catalytic hydroxylation of a compound of formula (I),

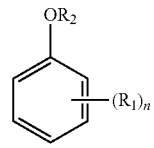

(I)

wherein:

n is a number from 0 to 4, preferably equal to 0, 1 or 2;

$R_i$, which are identical or different, represent an alkyl group, an alkoxy group, a hydroxyl group, a halogen atom, a haloalkyl group or a perhaloalkyl group;

$R_2$ represents a hydrogen atom, an alkyl group, a cycloalkyl group, an aryl group or an aralkyl group.

by reaction of said compound of formula (I) with $H_2O_2$, in the presence of a catalyst comprising a microporous aluminotitanosilicate crystalline zeolite having a three-dimensional framework of $AlO_2$, $SiO_2$ and $TiO_2$ tetrahedral units and an empirical composition in the as synthesized and anhydrous basis expressed by an empirical formula of:

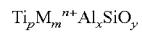

wherein:

p is the mole ratio of Ti to Si and has a value from 0.005 to about 0.1,

M represents a potassium ion and/or sodium ion, or their exchangeable cations, m is the mole ratio of M to Si and varies from about 0.001 to about 0.05, n is the valence of M, x is the mole ratio of Al to Si and varies from 0.0025 to about 0.1; and y and has a value determined by the equation:

$$y=(4 \cdot p+m \cdot n+3 \cdot x+4)/2$$

and is characterized in that it has the x-ray diffraction pattern having at least the intensities set forth in Table A:

TABLE A

| 2θ(Degree) | I/Io % |
|---|---|
| 6.45-6.8 | m |
| 6.75-7.13 | m-vs |
| 7.86-8.26 | m |
| 8.64-9.04 | m |
| 9.51-10.09 | m-vs |
| 10.62-11.23 | w-m |
| 13.4-14.22 | w-m |
| 14.76-15.55 | w |
| 17.63-18.37 | m |
| 19.17-19.91 | w-m |
| 19.64-20.56 | m |
| 20.18-21.05 | w-m |
| 20.7-21.57 | w-m |
| 21.36-22.28 | vs |
| 22.17-23.6 | m-s |
| 22.7-23.8 | w-m |
| 24.12-25.23 | w |
| 25.6-26.94 | m |
| 26.37-27.79 | m |
| 27.02-28.42 | m |
| 27.53-28.89 | m |
| 28.7-30.09 | m |
| 29.18-30.72 | w-m |
| 30.19-31.73 | m |
| 30.83-32.2 | w |

TABLE A-continued

| 2θ(Degree) | I/Io % |
|---|---|
| 32.81-34.22 | w |
| 35.63-36.99 | w |
| 41.03-42.86 | w |
| 44.18-45.83 | w |
| 44.87-46.57 | w |
| 46.07-47.35 | w |
| 48.97-50.42 | w | wherein: the ratio of MSE framework characteristic peak intensity at a 2θ angle equal to 21.7 degree, to MFI framework characteristic peak intensity at a 2θ angle equal to 23.3 degree ranges from 80:1 to 1:1 in x-ray diffraction pattern.

Without wishing to be bound to any particular theory, high $H_2O_2$ conversion and high selectivity towards para-hydroxylation of a compound of formula (I) can be obtained when the catalyst comprising zeolite according to the present invention is used.

Without wishing to be bound to any particular theory, high $H_2O_2$ conversion and high selectivity of hydroquinone can be obtained when the catalyst comprising zeolite according to the present invention is used.

Advantageously the process according to the present invention allows to control the ortho/para hydroxylation product ratio. In particular the ortho/para molar ratio is lower or equal to 1, preferably lower or equal to 0.5, more preferably lower or equal to 0.2 and still more preferably lower or equal to 0.1.

In particular, in the hydroxylation of phenol the molar ratio of catechol/hydroquinone is lower or equal to 1, preferably lower or equal to 0.5, more preferably lower or equal to 0.2 and still more preferably lower or equal to 0.1.

According to a specific aspect of the present invention, $R_2$ is selected from the group consisting of H, $C_1$-$C_6$ alkyl group. More preferably $R_2$ is selected from the group consisting of H, methyl, ethyl, propyl and isopropyl.

The compound represented by the general formula (I) can be notably phenol, m-cresol, o-cresol, 2-methoxyphenol or 2-ethoxyphenol.

The compound represented by the general formula (I) can be an alkyl phenyl ether, such as anisole or phenetol.

Advantageously, the catalyst comprises solely microporous aluminotitanosilicate crystalline zeolite according to the present invention.

The weight ratio of the catalyst to the compound of formula (I) can be from 0.1% to 20%. Preferably the weight ratio of the catalyst to the compound of formula (I) is higher or equal to 0.4%, more preferably higher or equal to 1%. Preferably the weight ratio of the catalyst to the compound of formula (I) is lower or equal to 15%, and more preferably lower or equal to 10%.

The $H_2O_2$ employed according to the invention can be in the form of an aqueous solution or of an organic solution.

The concentration of the $H_2O_2$ aqueous solution, although not critical per se, is chosen so as to introduce the least possible amount of water into the reaction medium. Use is generally made of an aqueous hydrogen peroxide solution comprising at least 10% by weight of $H_2O_2$ and preferably approximately 30%. The concentration of the $H_2O_2$ aqueous solution is typically from 10% to 70% by weight of $H_2O_2$ and usually from 20% to 30%.

It is preferable, in order to obtain an industrially acceptable yield, to use a $H_2O_2$/compound of formula (I) molar ratio from 0.01 to 0.5 and, preferably, from 0.10 to 0.40.

The $H_2O_2$ employed may be added in one portion or by portion.

The $H_2O_2$ feeding style was adjusted in present work to improve the $H_2O_2$ utilization efficiency up to 70%.

The results indicated that slowing the addition speed of $H_2O_2$ was effective to increase the $H_2O_2$ utilization efficiency without obvious decrease of total yield.

The present invention can be carried out by any of the batch process, a semi-batch process and a continuous flow process. Various types of reactor may be used for performing the process according to the invention. Advantageously, the process according to the invention is performed in a stirred reactor or a cascade of stirred reactors or alternatively in a piston-flow reactor, for example a tubular reactor placed horizontally, vertically or inclined.

Alternatively, the present invention can be carried out on a fixed bed reactor. The catalyst may be in the form of extrudates or beads.

Preferably, the hydroxylation reaction is performed in the presence of a solvent, chosen especially from water, a protic solvent, an aprotic solvent, a water/protic solvent mixture and water/aprotic solvent mixture. The protic solvent may be chosen from water, alcohols, especially methanol, ethanol, propanol, isopropanol or tert-butanol, and acids, especially acetic acid. The hydroxylation reaction is particularly preferably performed in water. The aprotic solvent may be acetone and any other ketone, nitriles such as acetonitrile, or esters such as methyl acetate, ethyl acetate, propyl acetate or butyl acetate.

Preferably, the solvent is used in a mole proportion of from 0.05 to 50 and preferably from 0.2 to 20, relative to compound of formula (I).

According to one variant, as specified above, the water may be mixed with other solvents in water/solvent mole proportions of from 1/0.01 to 1/20 and preferably from 1/0.1 to 1/2.

The temperature of the reaction is generally higher or equal to 30° C., preferably higher or equal to 40° C. and more preferably higher or equal to 50° C. In general the temperature of the reaction is lower or equal to 130° C., preferably lower or equal to 100° C. and more preferably lower or equal to 80° C.

The term "used catalyst" refers to a catalyst according to the present invention which has been used in a hydroxylation reaction.

The term "regenerated catalyst" refers to a used catalyst which has undergone a regeneration process. A used catalyst obtained at the end of the hydroxylation process may be regenerated according to any known method to the person skilled in the art. According to one aspect, the used catalyst may be regenerated by calcination. The calcination may be performed at a temperature higher or equal to 500° C., preferably higher or equal to 550° C., more preferably higher or equal to 600° C. and still more preferably higher or equal to 650° C. The calcination is generally performed at a temperature lower or equal to 900° C., preferably lower or equal to 850° C. and more preferably lower or equal to 800° C. The calcination is generally conducted for a period higher or equal to 4 hours, preferably higher or equal to 5 hours, more preferably higher or equal to 6 hours. The calcination is generally conducted for a period lower or equal to 12 hours, preferably lower or equal to 10 hours, more preferably lower or equal to 8 hours.

According to another aspect, the regeneration may be a chemical regeneration.

Generally the chemical regeneration can be performed using $H_2O_2$. The concentration of the $H_2O_2$ aqueous solution is typically from 10% to 70% by weight of $H_2O_2$ and usually from 20% to 45% by weight. The chemical regeneration is generally conducted at a temperature from 30° C., preferably higher than 40° C., more preferably higher than 50° C. The chemical regeneration is generally conducted at a temperature lower than 110° C., preferably lower than 100° C., more preferably lower than 90° C. The chemical regeneration is generally conducted for a period higher or equal to 2 hours, preferably higher or equal to 3 hours, more preferably higher or equal to 4 hours. The chemical regeneration is generally conducted for a period lower or equal to 12 hours, preferably lower or equal to 10 hours, more preferably lower or equal to 8 hours.

Advantageously the performance of a regenerated catalyst is equivalent to the performance of a fresh catalyst.

Should the disclosure of any patents, patent applications, and publications which are incorporated herein by reference conflict with the description of the present application to the extent that it may render a term unclear, the present description shall take precedence.

EXPERIMENTAL PART

The disclosure will now be illustrated with working examples, which is intended to illustrate the working of disclosure and not intended to take restrictively to imply any limitations on the scope of the present disclosure. Other examples are also possible which are within the scope of the present disclosure.

Example 1

0.2 g $Al(OH)_3$, 0.28 g KOH, 0.12 g NaOH and 30 g water were added into autoclave that was heated in oven at 120° C. for 12 hours to dissolve Al precursor. Then 2.25 g solution (40% DMDPAOH: dimethyldipropylammonium hydroxide, from SACHEM) and 6.67 g 30% silica sol were added and kept stirring for 10 min, which was followed by the addition of 0.2 g aluminosilicate MCM-68 (as obtained with the method described in Green Chem., 2016, 18, 735-741) as seed.

After another 2 hours stirring, the autoclave was put at 170° C. for 4 days. The sample was then filtered, washed with water and dried.

Si/Al atomic ratio of this sample is 7.4, determined by Inductively Coupled Plasma Atomic Emission Spectrometry (ICP-AES).

The resulting material was dealuminated by treatment of acid washing and calcination. In a typical step, the material was mixed with 1 M $HNO_3$ solution under reflux conditions for 24 hours, which was then washed with water, dried at 80° C. and calcined at 650° C. for 10 hours. After that, the material was again treated with 6 M $HNO_3$ solution under reflux conditions for 24 hours. The sample, after filtration and drying, afforded Si/Al atomic ratio of 263 that was determined by Inductively Coupled plasma Atomic Emission Spectrometry (ICP-AES).

The dealuminated sample was heated to 500° C. in a flow of $N_2$ for 2 hours, followed flowing $N_2$ bubbled through a vessel containing $TiCl_4$. The sample after titanation was finally calcined at 600° C. for 2 hours to get the porous crystalline zeolite of the invention.

The Si/Ti atomic ratio of this zeolite is 70, determined by Inductively Coupled Plasma Atomic Emission Spectrometry (ICP-AES).

Representative diffraction lines observed from the product are shown in Table B:

TABLE B

| 2θ(Degree) | I/Io % |
|---|---|
| 6.56 | m |
| 6.86 | m |
| 8.06 | m |
| 8.78 | m |
| 9.68 | m |
| 10.82 | w |
| 13.7 | w |
| 14.84 | w |
| 17.96 | w |
| 19.4 | m |
| 19.94 | m |
| 20.54 | m |
| 21.01 | m |
| 21.7 | vs |
| 22.46 | m |
| 23 | m |
| 23.3 | m |
| 23.78 | w |
| 24.02 | m |
| 24.56 | w |
| 25.88 | m |
| 26.12 | m |
| 26.78 | m |
| 27.5 | m |
| 28.1 | m |
| 28.88 | m |
| 29.18 | m |
| 29.6 | m |
| 30.14 | m |
| 30.8 | m |
| 31.28 | w |
| 33.26 | m |
| 36.08 | w |
| 41.18 | w |
| 44.6 | w |
| 45.56 | w |
| 46.4 | w |
| 49.64 | w |

FIG. 1 is a XRD image of microporous aluminotitanosilicate crystalline zeolite according to the present invention, ZSM-5 (pure MFI) and MCM-68 (pure MSE). It shows the zeolite according to the present invention has both MSE framework characteristic peak and MFI framework characteristic peak and the ratio of MSE framework characteristic peak intensity at a 2θ angle equal to 21.7 degree, to MFI framework characteristic peak intensity at a 2θ angle equal to 23.3 degree ranges from 80:1 to 1:1 in x-ray diffraction pattern.

NaOH treatment of zeolite according to the present invention was done by mixing 1 g zeolite with 30 g 0.2 M NaOH aqueous solution for 30 min at 65° C.

Figure 2:
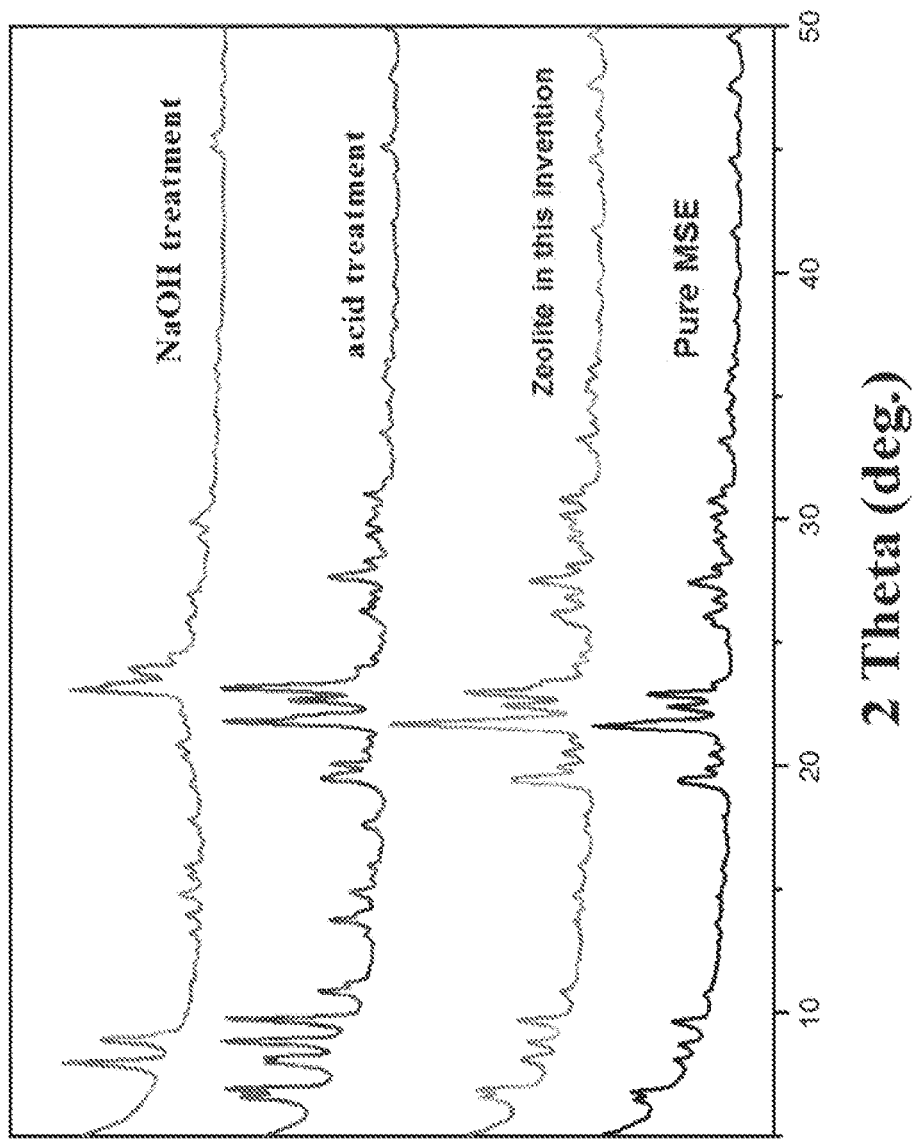
FIG. 2 is a XRD image of microporous aluminotitanosilicate crystalline zeolite according to the present invention, MCM-68 (pure MSE), and zeolite according to the present invention treated by an alkali and an acid.

Acid treatment of zeolite according to the present invention was done by mixing zeolite with 1 M $HNO_3$ aqueous solution under reflux conditions for 24 hours, which was then washed with water, dried at 80° C. and calcined at 650° C. for 10 hours. After that, the material was again treated with 6 M $HNO_3$ solution under reflux conditions for 24 hours. As shown in FIG. 2, MSE framework disappeared while MFI framework remained after NaOH treatment of the zeolite, illustrating the presence of MFI in zeolite. On the other hand, the framework of zeolite according to the present invention is unchanged after acid treatment.

Example 2

The hydroxylation of phenol with $H_2O_2$ was performed as follows: Microporous aluminotitanosilicate crystalline zeolite prepared by Example 1 (20 mg), phenol (21.25 mmol) and a 31 wt % aqueous solution of $H_2O_2$ (4.25 mmol) were loaded into a reactor. 4 g ethanol as solvent was then added to the mixture. The reaction mixture was stirred at 70° C. for 60 min, and then immediately cooled in an ice bath to stop the reaction. 97.5% $H_2O_2$ conversion, 52% $H_2O_2$ utilization efficiency ($H_2O_2$ efficiency=moles of (hydroquinone+catechol)/moles of $H_2O_2$ converted) and hydroquinone/catechol ratio of 12.5 were obtained.

Example 3

The hydroxylation of phenol with $H_2O_2$ was performed as follows: 0.2 g Microporous aluminotitanosilicate crystalline zeolite prepared by Example 1, 3 g $H_2O$, 5 g ethanol, 10 g phenol were loaded into a reactor. Reaction temperature was raised to 70° C. Then a 31 wt % aqueous solution of $H_2O_2$ (21.25 mmol) was dropwisely added within 2 h. Then the reaction was carried out for another 3 h. Finally, 97% $H_2O_2$ conversion, 80% $H_2O_2$ utilization efficiency ($H_2O_2$ efficiency=moles of (hydroquinone+catechol)/moles of $H_2O_2$ converted) and hydroquinone/catechol ratio of 8.3 were obtained.

Example 4

The hydroxylation of phenol with $H_2O_2$ was performed as follows: Microporous aluminotitanosilicate crystalline zeolite prepared by Example 1 (6.57 g), phenol (65.7 g, 0.70 mol) and a 30 wt % aqueous solution of $H_2O_2$ (0.25 mol) were loaded into a reactor. 28 g ethanol as solvent was then added to the mixture. The reaction mixture was stirred at 70° C. for 60 min, and then immediately cooled in an ice bath to stop the reaction. 99.7% $H_2O_2$ conversion, 82.9% $H_2O_2$ utilization efficiency ($H_2O_2$ efficiency =moles of (hydroquinone +catechol)/moles of $H_2O_2$ converted) and hydroquinone/catechol ratio of 12.5 were obtained.

Example 5

The hydroxylation of phenol with $H_2O_2$ was performed as follows: Microporous aluminotitanosilicate crystalline zeolite prepared by Example 1 (6.57 g), phenol (65.7 g, 0.70 mol) and a 30 wt % aqueous solution of $H_2O_2$ (0.125 mol) were loaded into a reactor. 28 g ethanol as solvent was then added to the mixture. The reaction mixture was stirred at 70° C. for 60 min, and then immediately cooled in an ice bath to stop the reaction. 99.5% $H_2O_2$ conversion, 96% $H_2O_2$ utilization efficiency ($H_2O_2$ efficiency=moles of (hydroquinone+catechol)/moles of $H_2O_2$ converted) and hydroquinone/catechol ratio of 12.5 were obtained.

Example 6

The hydroxylation of anisole with $H_2O_2$ was performed as follows: Microporous aluminotitanosilicate crystalline zeolite prepared by Example 1 (20 mg), anisole (21.25 mmol) and a 31 wt % aqueous solution of $H_2O_2$ (4.25 mmol) were loaded into a reactor. 4 g ethanol as solvent was then added to the mixture. The reaction mixture was stirred at 70° C. for 60 min, and then immediately cooled in an ice bath to stop the reaction. 98% $H_2O_2$ conversion, 85% $H_2O_2$ utilization efficiency ($H_2O_2$ efficiency=moles of (para-methoxyphenol+guaiacol)/moles of $H_2O_2$ converted) and para-methoxyphenol/guaiacol ratio of 10 were obtained.

Comparative Example 1

Phenol Hydroxylation by Using Ti-MCM-68

Ti-MCM-68: Si/Ti=52, Si/Al=76.
The hydroxylation of phenol with $H_2O_2$ was performed as follows. Ti-MCM-68 (20 mg), phenol (21.25 mmol) and a 31 wt % aqueous solution of $H_2O_2$ (4.25 mmol) were loaded into a reactor. 4 g ethanol was then added to the mixture as solvent. The reaction mixture was stirred at 70° C. for 60 min, and then immediately cooled in an ice bath to stop the reaction. 49% $H_2O_2$ conversion, 52% $H_2O_2$ utilization efficiency ($H_2O_2$ efficiency=moles of (hydroquinone+catechol)/moles of $H_2O_2$ converted) and hydroquinone/catechol ratio of 12.5 were obtained.

Comparative Example 2

Phenol Hydroxylation by Using Dealuminated Aluminosilicate Zeolite

The dealuminated aluminosilicate zeolite was prepared in the same way as Example 1 except titanation step. The hydroxylation of phenol with $H_2O_2$ was performed in the same way as Example 2. By using such zeolite as catalyst, $H_2O_2$ conversion is less than 1%.

Comparative Example 3

Phenol Hydroxylation by Titanium Silicalite-1

0.2 g titanium silicalite-1 (TS-1), 3 g $H_2O$, 5 g ethanol, 10 g phenol were loaded into a reactor. Reaction temperature was raised to 70° C. Then a 31 wt % aqueous solution of $H_2O_2$ (21.25 mmol) was dropwisely added within 2 h. Then the reaction was carried out for another 3 h. Finally, 53% $H_2O_2$ conversion, 64% $H_2O_2$ utilization efficiency ($H_2O_2$ efficiency=moles of (hydroquinone+catechol)/moles of $H_2O_2$ converted) and hydroquinone/catechol ratio of 1.6 were obtained.

Example 7

The process was done the same as Example 1, except that 3 g solution (40% DMDPAOH: dimethyldipropylammonium hydroxide, from SACHEM) instead of 2.25 g. Table B can be referred to understand the representive diffraction lines observed from the product. The corresponding XRD image is same with FIG. 1.

The invention claimed is:

1. A microporous aluminotitanosilicate crystalline zeolite having a three-dimensional framework of $AlO_2$, $SiO_2$ and $TiO_2$ tetrahedral units and an empirical composition in the as synthesized and anhydrous basis expressed by an empirical formula of:

$$Ti_p M_m^{n+} Al_x SiO_y$$

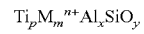

wherein:
  p is the mole ratio of Ti to Si and has a value from 0.005 to about 0.1,
  M represents a potassium ion and/or sodium ion, or their exchangeable cations,
  m is the mole ratio of M to Si and varies from about 0.001 to about 0.05,
  n is the valence of M,
  x is the mole ratio of Al to Si and varies from 0.0025 to about 0.1; and y has a value determined by the equation:

$$y=(4 \cdot p + m \cdot n + 3 \cdot x + 4)/2$$

and is characterized in that it has the x-ray diffraction pattern having at least the intensities set forth in Table A:

TABLE A

| 2θ(Degree) | I/Io % |
|---|---|
| 6.45-6.8 | m |
| 6.75-7.13 | m-vs |
| 7.86-8.26 | m |
| 8.64-9.04 | m |
| 9.51-10.09 | m-vs |
| 10.62-11.23 | w-m |
| 13.4-14.22 | w-m |
| 14.76-15.55 | w |
| 17.63-18.37 | m |
| 19.17-19.91 | w-m |
| 19.64-20.56 | m |
| 20.18-21.05 | w-m |
| 20.7-21.57 | w-m |
| 21.36-22.28 | vs |
| 22.17-23.6 | m-s |
| 22.7-23.8 | w-m |
| 24.12-25.23 | w |
| 25.6-26.94 | m |
| 26.37-27.79 | m |
| 27.02-28.42 | m |
| 27.53-28.89 | m |
| 28.7-30.09 | m |
| 29.18-30.72 | w-m |
| 30.19-31.73 | m |
| 30.83-32.2 | w |
| 32.81-34.22 | w |
| 35.63-36.99 | w |
| 41.03-42.86 | w |
| 44.18-45.83 | w |
| 44.87-46.57 | w |
| 46.07-47.35 | w |
| 48.97-50.42 | w | wherein: the ratio of MSE framework characteristic peak intensity at a 2θ angle equal to 21.7 degree, to MFI framework characteristic peak intensity at a 2θ angle equal to 23.3 degree ranges from 80:1 to 1:1 in x-ray diffraction pattern.

2. The zeolite according to claim 1, wherein p is from 0.008 to 0.1.

3. The zeolite according to claim 1, wherein m is from 0.001 to 0.01.

4. The zeolite according to claim 1, wherein x is from 0.0025 to 0.02.

5. The zeolite according to claim 1, wherein y is from 2 to 3.

6. The zeolite according to claim 1, wherein the zeolite has both MSE-type framework and MFI-type framework and the weight ratio of the crystalline zeolite existing in the form of MSE-type framework is in the range of 50% to 99% based on total weight of the zeolite and the weight ratio of the crystalline zeolite existing in the form of MFI-type framework is in the range of 1% to 50% based on total weight of the zeolite.

7. A method for synthesizing a microporous aluminotitanosilicate crystalline zeolite according to claim 1, the method comprising at least the following steps:
(i) preparing a mixture comprising at least water and
an aluminum source,
an alkali source,
a structure directing agent,
a silicon source,
a crystalline aluminosilicate zeolite having a three-dimensional framework of $AlO_2$ and $SiO_2$ tetrahedral units and having an MSE framework type, (ii) heating the reaction mixture at a temperature from 100° C. to 200° C., for a time sufficient to form a zeolite,
(iii) dealuminating of the zeolite with an acid,
(iv) optionally calcining the dealuminated zeolite at a temperature from 500 to 1000° C.,
(v) contacting the zeolite with a titanium source; and
(vi) calcining the zeolite at a temperature from 500 to 1000° C.

8. The method according to claim 7, wherein the structure directing agent in step (i) is an organic compound having an organoammonium cation selected from the group consisting of dimethyldipropylammonium, choline, ethyltrimethylammonium(ETMA), diethyldimethylammonium(DEDMA), tetraethylammonium(TEA), tetrapropylammonium(TPA), trimethylpropylammonium, trimethylbutylammonium, dimethyldiethanolammonium and mixtures thereof.

9. The method according to claim 7, wherein the structure directing agent in step (i) is hydroxide compound, chloride compound, bromide compound, iodide compound or fluoride compound.

10. The method according to claim 7, wherein the structure directing agent in step (i) is selected from the group consisting of be dimethyldipropylammonium hydroxide, dimethyldipropylammonium chloride, dimethyldipropylammonium bromide, ethyltrimethylammonium hydroxide, diethyldimethylammonium hydroxide, tetraethylammonium hydroxide, tetrapropylammonium hydroxide or tetrapropylammonium chloride.

11. The method according to claim 7, wherein the crystalline aluminosilicate zeolite having a three-dimensional framework of $AlO_2$ and $SiO_2$ tetrahedral units and having an MSE framework type in step (i) is MCM-68, YNU-2 or UZM-35.

12. The method according to claim 7, wherein the weight ratio of silicon source to the crystalline aluminosilicate zeolite having a three-dimensional framework of $AlO_2$ and $SiO_2$ tetrahedral units and having an MSE framework type is in the range of 3:1 to 40:1.

13. The method according to claim 7, wherein the alkali source comprises potassium hydroxide and/or potassium salts.

14. The method according to claim 13, wherein the alkali source comprises potassium hydroxide and/or potassium salts, and sodium hydroxide and/or sodium salts; wherein the molar ratio of $K^+/Na^+$ is in the range of 2 to 5.

15. The method according to claim 7, wherein atomic Si/Al ratio is from 50 to 400 after step (iii).

16. The method according to claim 7, wherein the titanium source is introduced in gas phase in step (v).

17. A catalyst composition comprising a microporous aluminotitanosilicate crystalline zeolite according to claim 1.

18. The catalyst composition according to claim 17, wherein the catalyst composition comprises 50 wt. % to 100 wt. % microporous aluminotitanosilicate crystalline zeolite based on total weight of the catalyst.

19. A catalytic hydroxylation reaction, comprising reacting a compound of formula (I) with $H_2O_2$ in the presence of a catalyst comprising a microporous aluminotitanosilicalite crystalline zeolite according to claim 1,

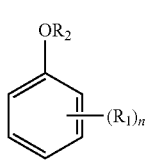

wherein:
n is a number from 0 to 4;
$R_1$, which are identical or different, represent an alkyl group, an alkoxy group, a hydroxyl group, a halogen atom, a haloalkyl group or a perhaloalkyl group;
$R_2$ represents a hydrogen atom, an alkyl group, a cycloalkyl group, an aryl group or an aralkyl group.

20. The catalytic hydroxylation reaction according to claim 19, wherein the compound of formula (I) is selected from the group consisting of phenol, m-cresol, o-cresol, 2-methoxyphenol, 2-ethoxyphenol, anisole and phenetol; or wherein the ortho/para molar ratio is lower or equal to 1.

* * * * *